United States Patent
Kawachi et al.

(10) Patent No.: US 9,321,488 B2
(45) Date of Patent: Apr. 26, 2016

(54) FRONT BODY STRUCTURE

(75) Inventors: Takeshi Kawachi, Tokyo (JP); Toshiyuki Niwa, Tokyo (JP); Seiichi Daimaru, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 0 days.

(21) Appl. No.: 14/003,956

(22) PCT Filed: Mar. 8, 2012

(86) PCT No.: PCT/JP2012/056010
§ 371 (c)(1),
(2), (4) Date: Nov. 5, 2013

(87) PCT Pub. No.: WO2012/121347
PCT Pub. Date: Sep. 13, 2012

(65) Prior Publication Data
US 2014/0049073 A1    Feb. 20, 2014

(30) Foreign Application Priority Data
Mar. 9, 2011 (JP) ................ 2011-051359

(51) Int. Cl.
*B62D 25/08* (2006.01)
*B62D 25/04* (2006.01)

(52) U.S. Cl.
CPC ............. *B62D 25/088* (2013.01); *B62D 25/04* (2013.01); *B62D 25/081* (2013.01); *B62D 25/082* (2013.01)

(58) Field of Classification Search
CPC .... B62D 25/088; B62D 25/04; B62D 25/081; B62D 25/082
USPC .................................... 296/193.09
See application file for complete search history.

(56) References Cited

U.S. PATENT DOCUMENTS

2004/0195863 A1    10/2004    Saeki

FOREIGN PATENT DOCUMENTS

| EP | 1084937 | 3/2001 |
|---|---|---|
| JP | 4-26880 | 3/1992 |

(Continued)

OTHER PUBLICATIONS

International Search Report dated Apr. 17, 2012 issued in corresponding PCT Application No. PCT/JP2012/056010.

(Continued)

*Primary Examiner* — Glenn Dayoan
*Assistant Examiner* — Melissa A Black
(74) *Attorney, Agent, or Firm* — Kenyon & Kenyon LLP

(57) ABSTRACT

A front vehicle body structure for a vehicle body (1) having a vehicle interior compartment (2) and a front compartment (3) which is provided in front of the vehicle interior compartment (2). The front vehicle body structure is provided with: strut towers (16) to which the upper edges of struts for the front wheels are mounted; front pillars (20) extending, at positions at the front of the vehicle interior compartment and on both sides in the width direction, from the roof of the vehicle interior compartment toward the upper edge of the rear of the front compartment; and reinforcement members (25, 70) each having one end joined to the strut tower and the other end joined to the front pillar. Each of the reinforcement members is joined to the strut tower on both the inner side and outer side of a plane (S) with respect to the vehicle body, the plane (S) passing through the axis of the strut and extending in the front-rear direction of the vehicle body. As a result of the configuration, the front vehicle body structure can efficiently increase the torsional rigidity of the vehicle body of the automobile and in turn can efficiently reduce the weight of the vehicle body by a plate thickness reduction achieved using a high-tensile steel plate.

5 Claims, 10 Drawing Sheets

(56) References Cited

FOREIGN PATENT DOCUMENTS

| | | |
|---|---|---|
| JP | 04-254264 | 9/1992 |
| JP | 7-25360 | 1/1995 |
| JP | 07-025360 | 1/1995 |
| JP | 7-25361 | 1/1995 |
| JP | 07-025361 | 1/1995 |
| JP | 09-071267 | 3/1997 |
| JP | 11-291943 | 10/1999 |
| JP | 2004-203182 | 7/2004 |
| JP | 2004-276789 | 10/2004 |
| JP | 2004-306689 | 11/2004 |
| JP | 2009-078575 | 4/2009 |
| JP | 2010-155559 | 7/2010 |

OTHER PUBLICATIONS

Search Report dated Oct. 2, 2014 issued in corresponding European Application No. 12754894.

FRONT BODY STRUCTURE

This application is a national stage application of International Application No. PCT/JP2012/056010, filed Mar. 8, 2012, which claims priority to Japanese Application No. 2011-051359, filed Mar. 9, 2011, the content of which is incorporated by reference in its entirety.

TECHNICAL FIELD

This invention relates to a front body structure for improving the stiffness of an automobile body.

BACKGROUND ART

As is well known, to improve the fuel efficiency or the driving performance of automobiles or to absorb the increase in weight accompanying safety measures or fuller options, reduction of the weight of automobiles is being sought. For this reason, for example, high strength steel sheets are being used to reduce the thickness of the body structure and thereby lighten the weight of the body.

For example, when using 590 MPa class high strength steel sheets to lighten the body, it is considered possible to secure the body strength while reducing the weight by about 40% compared with conventional steel plate. Very great results have been anticipated.

On the other hand, since an automobile receives force from bumps on the road surface while driving, impact when riding over road shoulders etc., and various other forces, torsional stiffness is required in addition to body strength. However, if using high strength steel sheets to reduce the thickness of the body structure, even if the body strength is secured, the torsional stiffness generally falls.

That is, in high strength steel sheets, the tensile strength of the steel plate is improved by the temperature history, ingredients, etc., but the Young's modulus of iron is constant and does not change. For this reason, if the body structure is reduced in thickness, the polar moment of inertia of area becomes smaller. As a result, the torsional stiffness falls. Therefore, when using high strength steel sheets etc. to maintain the body strength while reducing the thickness of the body so as to lighten the weight, it is also necessary to improve the torsional stiffness.

Regarding the torsional stiffness of the body, as art focusing on the front body structure, for example, art such as shown in PLTs 1 and 2 is disclosed.

Specifically, PLT 1 discloses providing hood ridge reinforcing parts which extend from front pillars forward to load input surfaces of strut towers and imaginary extensions which extend from front ends of the foot ridge reinforcing parts toward the front so as to pass through the input centers of the load input surfaces.

PLT 2 discloses to form strut housings as single parts and to join side members, hood ridges, a dash panel, and a cowl top panel to the strut housings to join them together.

Further, while not aimed at improvement of the torsional stiffness, art similar to that which is described in PLT 1 is disclosed in PLT 3. In PLT 3, the bottom ends of the front pillars are joined at the tops of the strut towers with the upper members. The front pillars and the hinge pillars and upper member which are positioned at their rears form ring shaped members with open center parts. Due to this, it is possible to effectively support the moment load which acts on the bottom ends of the front pillars.

CITATIONS LIST

Patent Literature
  PLT 1: Japanese Patent Publication No. 2010-155559A
  PLT 2: Japanese Patent Publication No. 2009-078575A
  PLT 3: Japanese Patent Publication No. 09-071267A

Technical Problem

In this regard, in the invention which is described in PLT 1, the hood ridge reinforcing parts which are joined with the front pillars are joined to the outside edges of the body at the load input surfaces of the strut towers. Further, in the invention as set forth in the above PLT 3, the bottom ends of the front pillars are joined with the upper members at the vehicle outside sides of the strut towers. Therefore, the joined parts of the hood ridge reinforcing parts or the front pillars are offset from the input direction of the load from the struts (members formed from shock absorbers and springs) to the strut towers (that is, from the axial directions of the struts) to the width direction of the body.

If a joined part becomes offset from the input direction of load to a strut tower in this way, when a load is applied from the strut to the strut tower, a large moment is generated at the joined part. If the moment becomes larger, the joined part deforms and, as a result, deformation of the vehicle is invited. For this reason, with the inventions as set forth in the above PLTs 1 and 3, sufficient torsional stiffness could not be obtained.

The present invention was made in consideration of this situation and has as its object the provision of a front body structure which enables efficient improvement of the torsional stiffness of the body of an automobile and in turn a front body structure which uses high strength steel sheets to reduce the thickness and thereby enable the weight of a body to be efficiently lightened.

Solution to Problem

To solve this problem, the inventors engaged in in-depth studies and as a result obtained the following finding. By providing reinforcing parts joined to the front pillars and the strut towers and joining these reinforcing parts to the strut towers at both the body-inside and body-outside from planes extending through the axes of the struts in the front-rear direction of the body, it is possible to keep a large moment from being generated at the joined parts of the reinforcing parts to the strut towers.

The present invention was made based on the above finding, and has as its gist the following.
(1) A front body structure in a body which has a passenger compartment and a front compartment which is arranged at a front side of the passenger compartment, comprising strut towers which are arranged inside the front compartment at the two sides of a width direction of the front compartment and to which top edges of front wheel use struts are attached; front pillars which extend at the front of the passenger compartment at the two sides in the width direction from the roof of the passenger compartment toward the rear top edge of the front compartment; and reinforcing parts with first ends joined to the strut towers and with other ends joined to the front pillars, wherein the reinforcing parts are joined to the strut towers at the two sides of the body-inside and body-outside from the planes extending in the front-rear direction of the body through the axes of the struts which are fastened to the strut towers.
(2) The front body structure as set forth in (1) wherein the reinforcing parts are integrally shaped members which are formed from the same blanks as component members forming at least parts of the front pillars.

(3) The front body structure as set forth in (2) wherein the front pillars comprise outer members which are arranged at the body-outside and inner members which are arranged at the body-inside, and the reinforcing parts are integrally shaped members which are formed from the same blanks at the inner members.

(4) The front body structure as set forth in any one of (1) to (3), further comprising a dash panel which separates the passenger compartment and the front compartment and a cowl top which extends above the dash panel in the width direction of the body, wherein the reinforcing parts are joined to the cowl top as well.

(5) The front body structure as set forth in (4) wherein the reinforcing parts are integrally shaped members which are formed from the same blanks as component members which form at least part of the cowl top.

(6) The front body structure as set forth in any one of (1) to (5), further comprising upper members which are arranged at width ends of the passenger compartment and extend in the front-rear direction of the body, wherein the reinforcing parts are joined to the upper members as well.

(7) The front body structure as set forth in (6) wherein the reinforcing parts are integrally shaped members which are formed from the same blanks as component members forming at least parts of the upper members.

Advantageous Effects of Invention

According to all of the front body structures according to this invention, the reinforcing parts are joined to the strut towers at both of the body-inside and body-outside of planes extending in the front-rear direction of the body through the axes of the struts which are fastened to the strut towers. Due to this, the load which is transmitted from the struts to the strut towers is transmitted to the reinforcing parts through joined parts with the reinforcing parts which are positioned at the vehicle inside from the struts and joined parts with the reinforcing parts which are positioned at the vehicle outside from the struts. For this reason, a large moment is not created between the strut towers and the reinforcing parts and as a result the torsional stiffness of the body can be raised.

DESCRIPTION OF EMBODIMENTS

Below, referring to FIG. 1 to FIG. 5, a first embodiment of the present invention will be explained.

Figure 1:
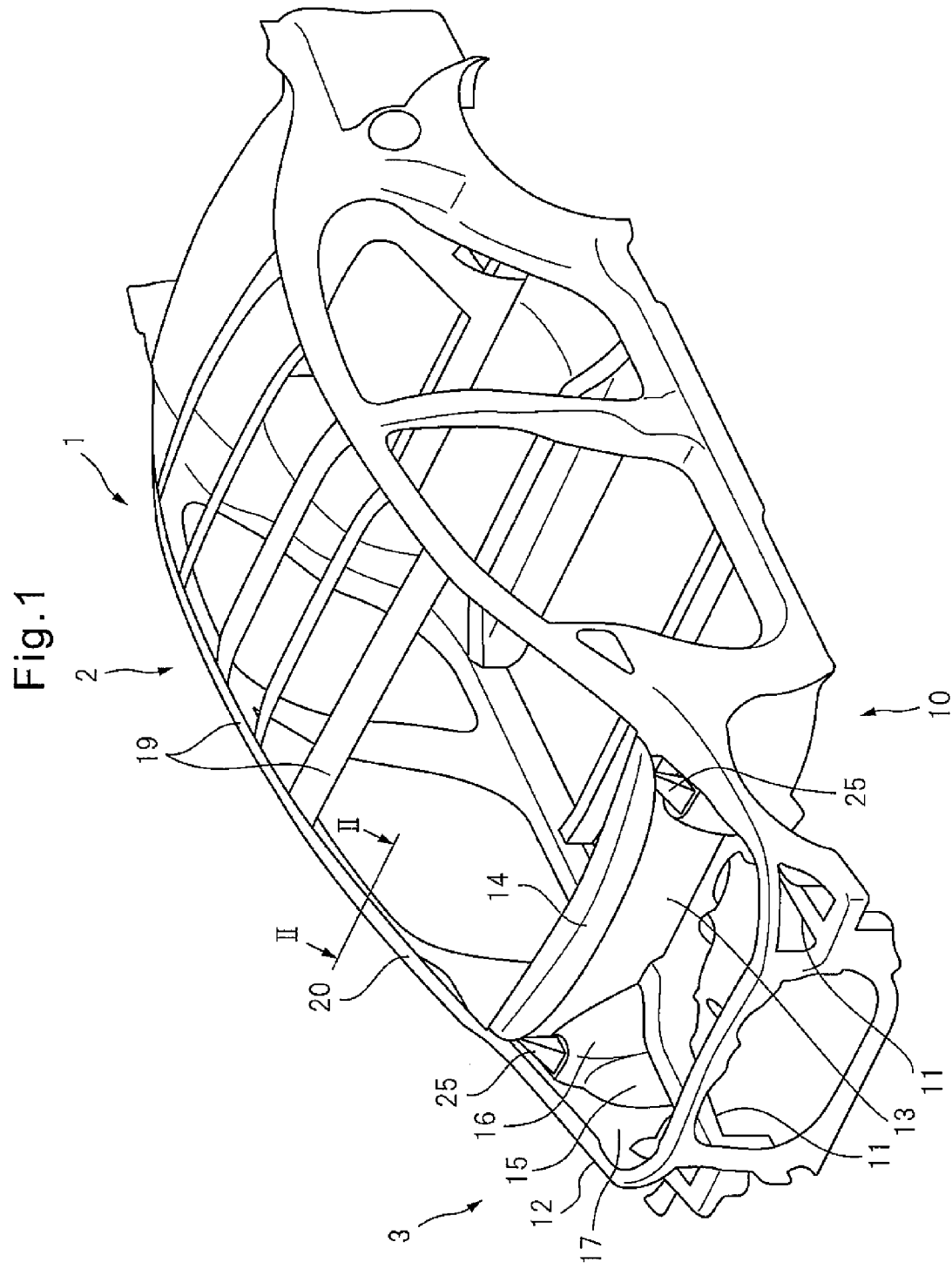
FIG. 1 is a view which shows an outline of the overall structure of a body according to a first embodiment of the present invention.

FIG. 1 is a view which shows a body 1 which has a front body structure 10 according to a first embodiment of the present invention. The body 1 is provided with a passenger compartment 2 which forms a space which a driver and passengers ride in, and a front compartment 3 which is arranged at the front side (left side in FIG. 1) of the passenger compartment 2. In the present embodiment, inside the front compartment 3, an engine or motor or other power unit for driving the wheels is mounted. Further, in the present embodiment, the main material of the body 1 is high strength steel.

The front body structure 10 according to the present embodiment is provided with a pair of front side members 11 which are positioned at the bottom of the front compartment 3 and extend in a front-rear direction of the body 1 and a pair of upper members 12 which extend at the top of the two ends, in the width direction, of the front compartment 3 in the front-rear direction of the body 1. The front body structure 10 is further provided with a dash panel 13 which extends in the width direction of the body 1 and separates the passenger compartment 2 and the front compartment 3, a cowl top 14 which extends at the top of this dash panel 13 in the width direction and forms a closed cross-sectional shape, and a pair of side panels 17 which extend from the upper members 12 to the bottom. In addition, the front body structure 10 is provided with a roof 19 which is arranged at the top of the passenger compartment 2 and a pair of front pillars 20 which extend at the front of the passenger compartment 2 at the two sides in the width direction toward the rear top edge of the front compartment 3.

The side panels 17 are provided with front wheel houses 15 and strut towers 16. The front wheel houses 15 bulge inward in the width direction of the body 1 and are formed so as to be joined with the front side members 11 at the bottom. The front wheel houses 15 are structured opening outward. At the insides thereof, front wheels (not shown) are arranged.

Further, the strut towers 16 are formed by the front wheel houses 15 and the side panels 17 at the top thereof bulging out to the inside of the body 1 in the width direction. Changing the way of viewing this, the strut towers 16 can be said to be provided to stick out to the top from ceiling parts of the front wheel houses 15. Whatever the case, the pair of strut towers 16 are arranged inside of the front compartment 3 at the two sides of the front compartment 3 in the width direction. Further, at the insides of the strut towers 16, struts for front wheels (not shown) are arranged. At the strut setting parts 18 of the strut towers 16 (top surfaces of strut towers), top ends of the struts for front wheel are fastened.

The front pillars 20, as shown in FIG. 1, have structures which are inclined gradually downward from the roof 19 of the passenger compartment 2 toward the front of the body 1 (front compartment 3 side). The bottom ends of the front pillars 20 are joined to the rear ends of the upper members 12 and the side ends of the cowl top 14.

Figure 2:
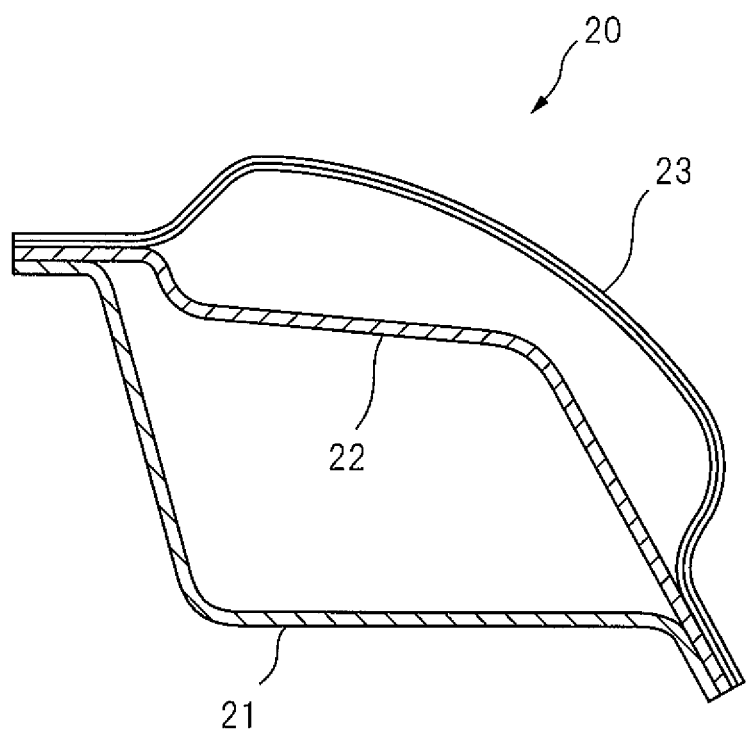
FIG. 2 is a cross-sectional view of a front pillar 20 which is seen along an arrow II-II of FIG. 1.

FIG. 2 is a cross-sectional view of a front pillar 20 as seen along the arrow II-II of FIG. 1. As will be understood from FIG. 2, a front pillar 20 is provided with an inner member 21 which is arranged at the body-inside and an outer member 22 which is arranged at the body-outside. These inner member 21 and outer member 22 are joined together by welding etc. whereby a closed cross-sectional shape is formed. Further, in the example which is shown in FIG. 2, an outer panel 23 is arranged at the body-outside of the outer member 22.

In addition, in the present embodiment, reinforcing parts 25 with first ends joined to the strut setting parts 18 of the strut towers 16 and with other ends joined to the front pillars 20 are provided.

Figure 3:
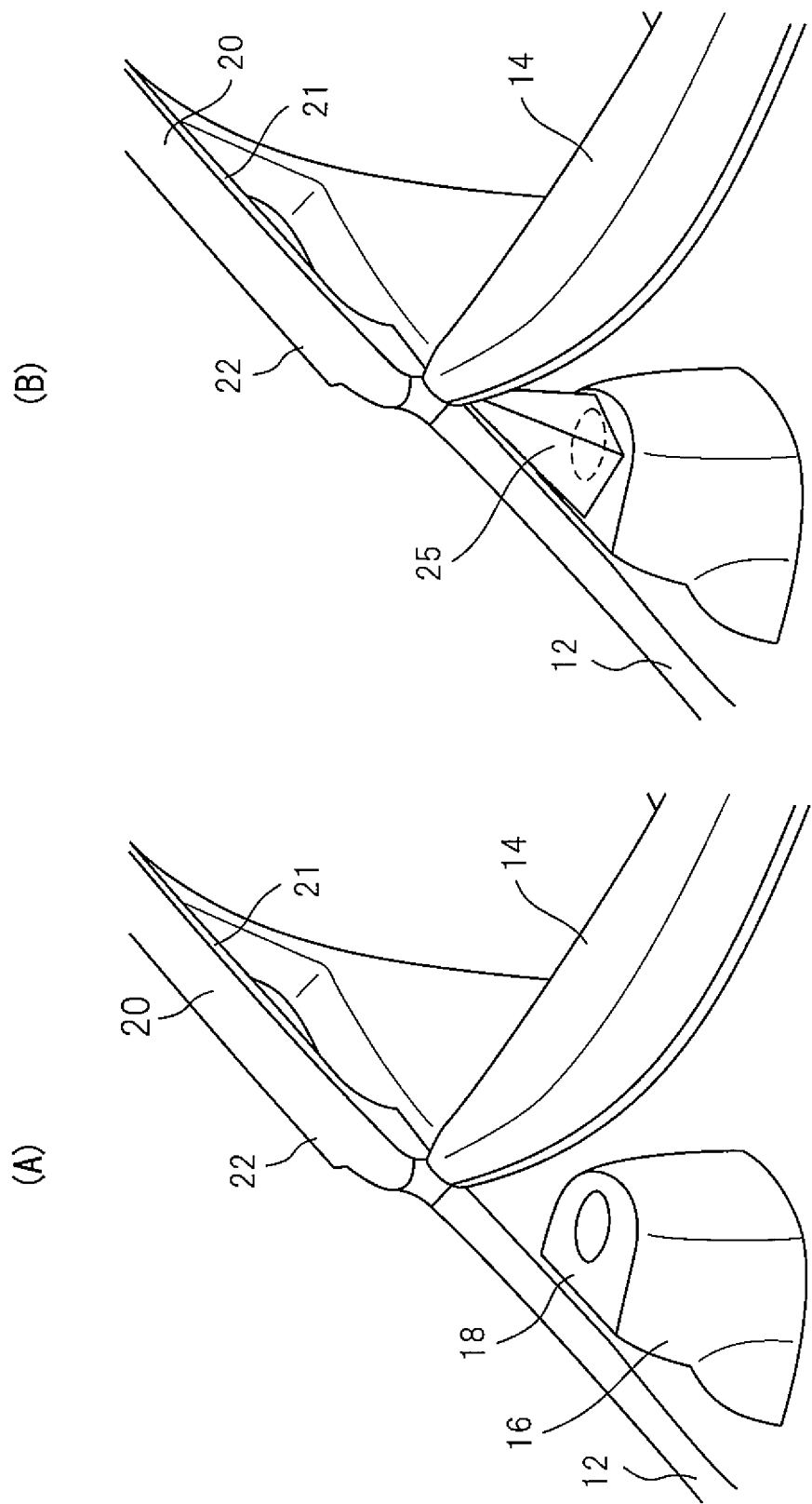
FIG. 3 is an enlarged perspective view of a front body structure of the first embodiment near a bottom end of one front pillar.
Figure 4:
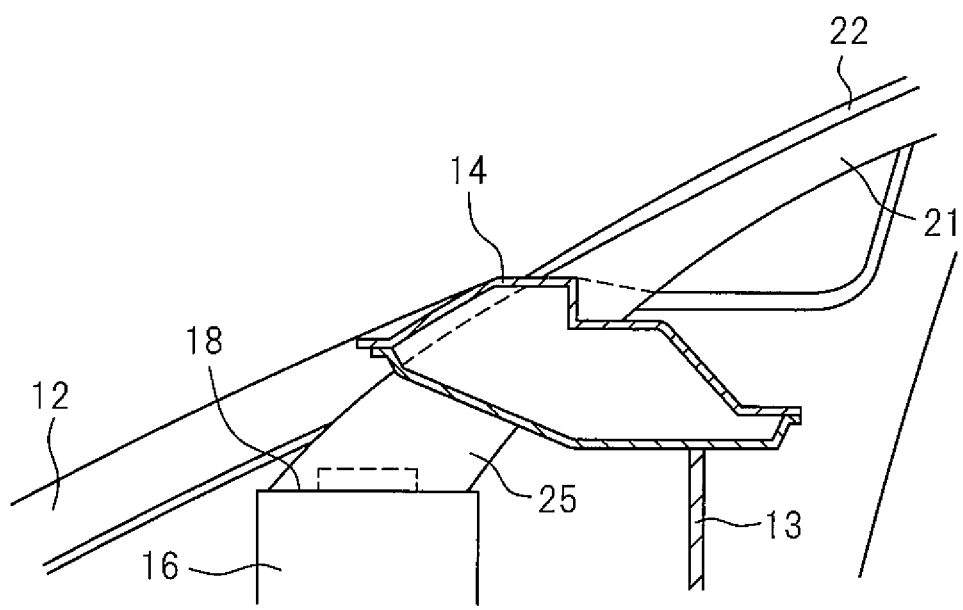
FIG. 4 is a side view of part of a front body structure according to the first embodiment as seen from the body-inside.
Figure 5:
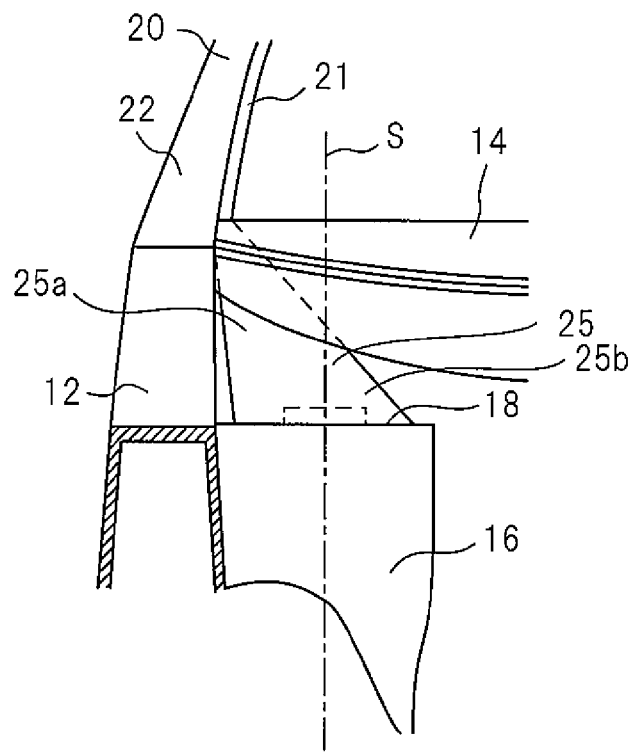
FIG. 5 is a cross-sectional front view of part of the front body structure according to the first embodiment.

FIG. 3 give enlarged perspective views of the front body structure 10 near the bottom end of one front pillar 20. Among these, FIG. 3(A) shows the case where no reinforcing member 25 is provided, while FIG. 3(B) shows the case where a reinforcing member 25 is provided. The reinforcing member 25 is connected at one end to a bottom end of an outer member 22 which forms the front pillar 20. In particular, in the present embodiment, the reinforcing member 25 and the inner member 21 are integrally shaped members which are formed from the same blank.

Figure 6:
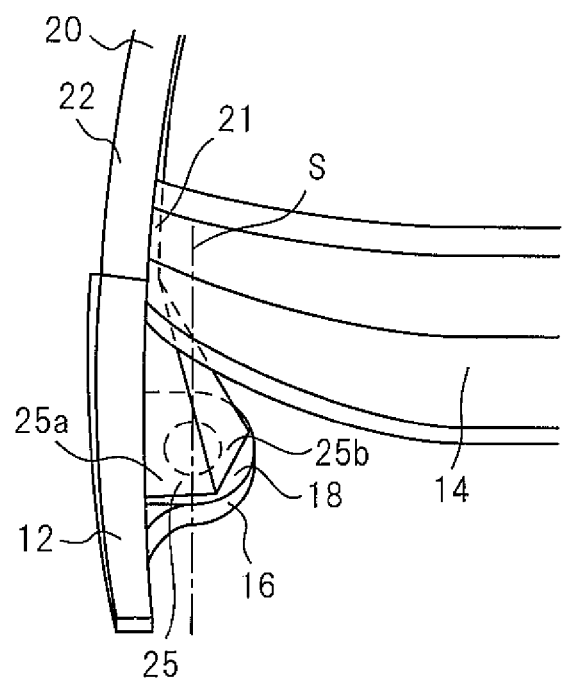
FIG. 6 is a top view of a part of the front body structure according to the first embodiment.

On the other hand, as will be understood from FIG. 3(B), the reinforcing member 25 is joined at the other end to a strut tower 16. In the present embodiment, the reinforcing parts 25 are joined to the strut towers 16 at both of the body-outside and body-inside from the planes S which pass through the axes of the struts (not shown) which are fastened to the strut towers 16, and extend in the front-rear direction of the body 1 (see cross-sectional front view of FIG. 5 and top view of FIG. 6). That is, the reinforcing parts 25 are provided with outside parts 25a which are joined to the strut towers 16 at the body-outside from the plane S and inside parts 25b which are joined to the strut towers 16 at the body-inside from the planes S. In particular, in the present embodiment, the bottom ends of the reinforcing parts 25 are joined to the strut setting parts 18 of the strut towers 16.

As a result, the reinforcing parts 25, as will be understood from FIGS. 3 to 6, are joined to the strut setting parts 18 around the load points of the strut setting parts 18 (that is, points where axes of struts and planes of strut setting parts 18 intersect). In particular, in the present embodiment, the bottom ends of the reinforcing parts 25 are arranged on the strut setting parts 18 and spot welded to the strut setting parts 18 so as to completely surround the load points of the strut setting parts 18.

According to the front body structure 10 of the present embodiment configured in this way, since reinforcing parts 25 are provided between the front pillars 20 and the strut setting parts 18 of the strut towers 16, it is possible to efficiently transmit the load which is input to the strut towers 16 to the front pillars 20.

In addition, the reinforcing parts 25 are joined to the strut setting parts 18 of the strut towers 16 at both the body-inside and body-outside from the planes S. In this regard, if a reinforcing member 25 were joined to a strut setting part 18 of a strut tower 16 at only one side of the planes S, if a load were applied from the strut to the strut setting part 18, a large moment would be generated at the joined part of the reinforcing member 25 and the strut setting part 18. If a large moment were generated in this way, the joined part would deform and deformation of the vehicle would be invited.

As opposed to this, in the present embodiment, as explained above, the reinforcing parts 25 are joined to the strut setting parts 18 at both the body-inside and body-outside of the planes S. For this reason, even if a load is applied from the struts to the strut setting parts 18, the joined parts of the reinforcing parts 25 and the strut setting parts 18 are not subjected to a large moment. For this reason, the surroundings of the strut setting parts 18 are kept from locally deforming. As a result, improvement of the torsional stiffness of the body 1 as a whole becomes possible.

Further, in the present embodiment, the reinforcing parts 25 are integrally shaped members which are formed from the same blanks as the front pillars 20. Here, if forming the reinforcing parts and the front pillars by separate members, these reinforcing parts and front pillars would be joined in a state superposed in a direction perpendicular to the load which is applied to these members. For this reason, if a load were transmitted from the reinforcing parts to the front pillars, the load would be transmitted in a direction perpendicular to the direction of the load which was applied to these members. For this reason, a moment would be generated between these members and a shear force would be applied to the joined parts of these members. Therefore, if forming the reinforcing parts and the front pillars by separate members, due to these moment and shear force, deformation would easily occur near the joined parts between these members. As a result, a drop in the torsional stiffness would be invited.

As opposed to this, as explained above, in the present embodiment, the reinforcing parts 25 are integrally shaped members which are formed from the same blanks as the front pillars 20. For this reason, the occurrence of a moment or shear force between the reinforcing parts 25 and the front pillars 20 is suppressed. As a result, the torsional stiffness of the body 1 as a whole can be improved.

In addition, when the reinforcing parts 25 are integrally shaped members which are formed from the same blanks as the front pillars 20, as explained above, compared with when forming the reinforcing parts and the front pillars separately and partially superposing them, it is possible to lighten the weight and streamline the structure of the body 1.

Note that, in the above embodiment, the reinforcing parts 25 were joined to the bottom ends of the inner members 21, but if first ends are joined to the front pillars 20, the reinforcing parts 25 do not necessarily have to be joined to the bottom ends of the inner members 21. Therefore, the reinforcing parts 25 may be joined to the center parts of the inner members 21 or may be joined to the bottom ends or center parts of the outer members 22.

Further, in the above embodiment, the reinforcing parts 25 were formed from the same blanks as the inner members 21 of the front pillars 20, but they do not necessarily have to be formed from the same blanks and may be formed separately. Further, as explained above, the reinforcing parts 25 may be joined to the outer members 22 as well. Considering this, the reinforcing parts 21 can be said to be integrally shaped members which are formed from the same blanks as the component members which form at least parts of the front pillars 20 (for example, the outer members 22 and inner members 21).

Furthermore, in the above embodiment, the reinforcing parts 25 were joined to the strut setting parts 18 so that their bottom ends completely surround the load points of the strut setting parts 18. However, if the reinforcing parts 25 are partially joined to the strut setting parts 18 at both the body-outside and body-inside of the planes S, there is not necessarily a need to be joined so as to completely surround the load points. Therefore, the reinforcing parts 25 also do not need to be closed cylindrical shapes such as shown in FIGS. 3 to 6. They may also be shapes comprised of pluralities of flat plates.

Figure 7:
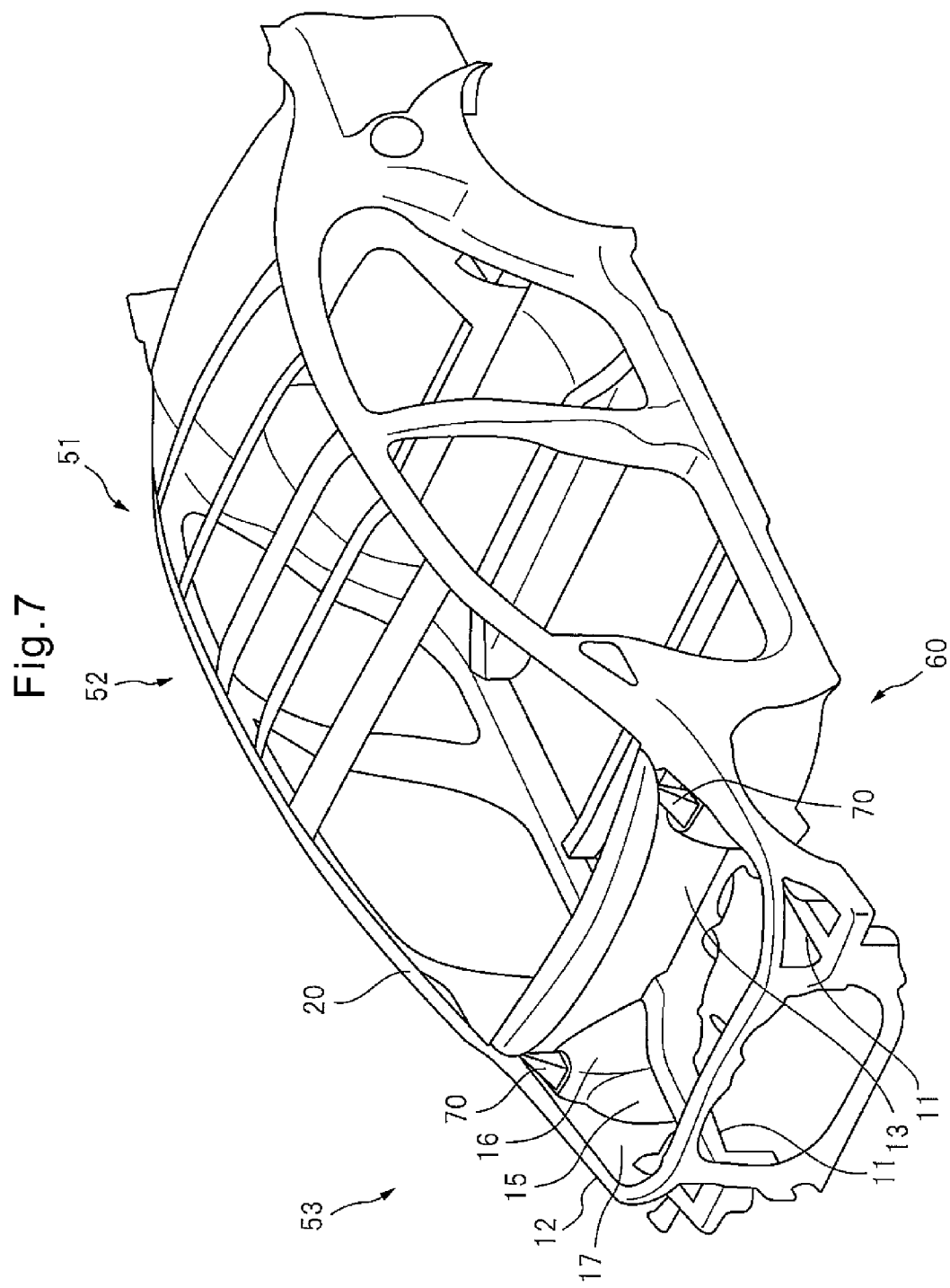
FIG. 7 is a view which shows an outline of the overall structure of a body according to a second embodiment of the present invention.

Next, referring to FIG. 7 to FIG. 11, a second embodiment of the present invention will be explained. FIG. 7 is a view which shows a body 51 which has a front body structure of a second embodiment of the present invention. Note that, members the same as those of the first embodiment will be assigned the same reference notations and detailed explanations will be omitted. The body 51 is provided with a passenger compartment 52 and a front compartment 53 which is arranged at the front side (left side in FIG. 6) of the passenger compartment 52.

Figure 8:
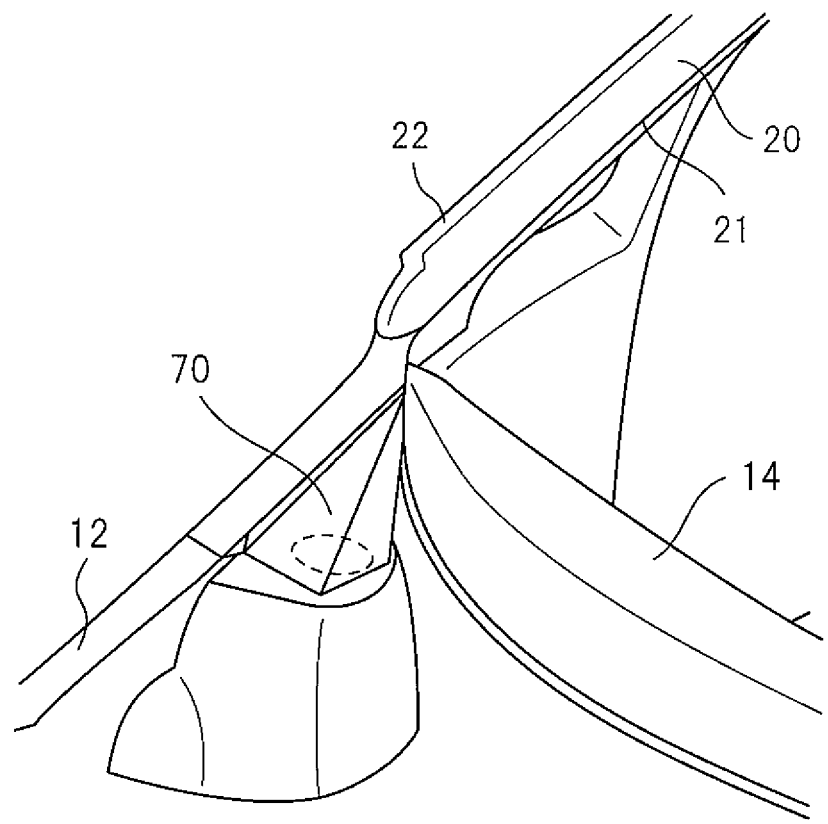
FIG. 8 is an enlarged perspective view of a front body structure of the second embodiment near a bottom end of one front pillar.
Figure 9:
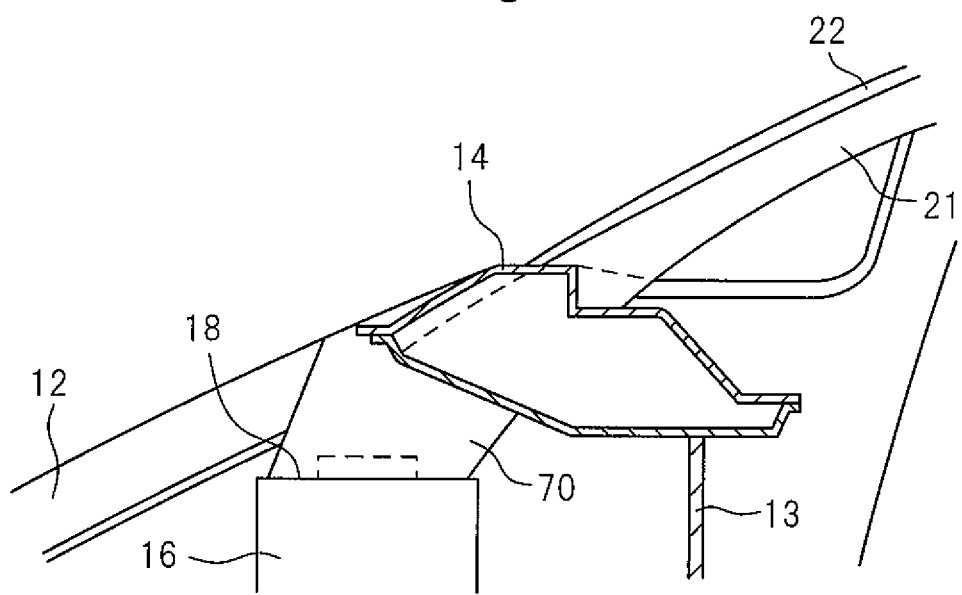
FIG. 9 is a side view of part of a front body structure according to the second embodiment as seen from the body-inside.

FIG. 8 is an enlarged perspective view of a front body structure 60 of the second embodiment near the bottom end of one front pillar 20. As will be understood from FIG. 8, in the front body structure 60 according to the second embodiment, the reinforcing parts 70 are joined to the upper members 12 and the cowl top 14. In particular, in the present embodiment, the body-outside parts of the reinforcing parts 70 are joined to the upper members 12 by spot welding, while the body-inside rear parts of the reinforcing parts 70 are joined to the cowl top 14 by spot welding.

Figure 10:
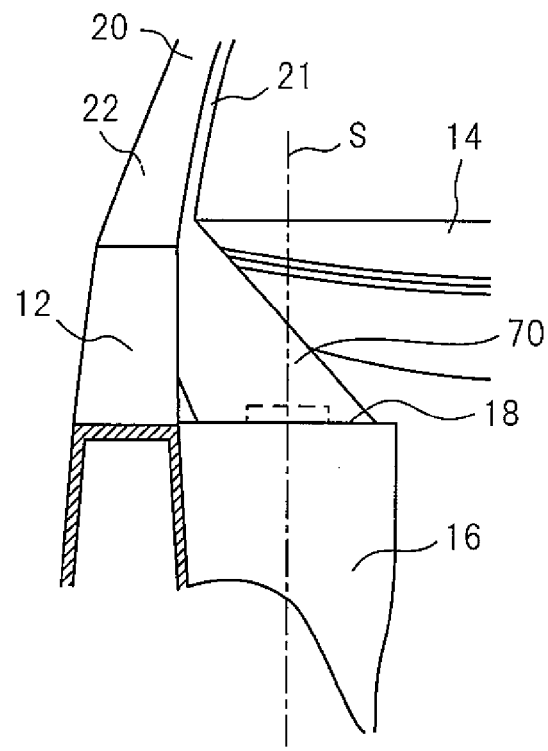
FIG. 10 is a cross-sectional front view of part of the front body structure according to the second embodiment.
Figure 11:
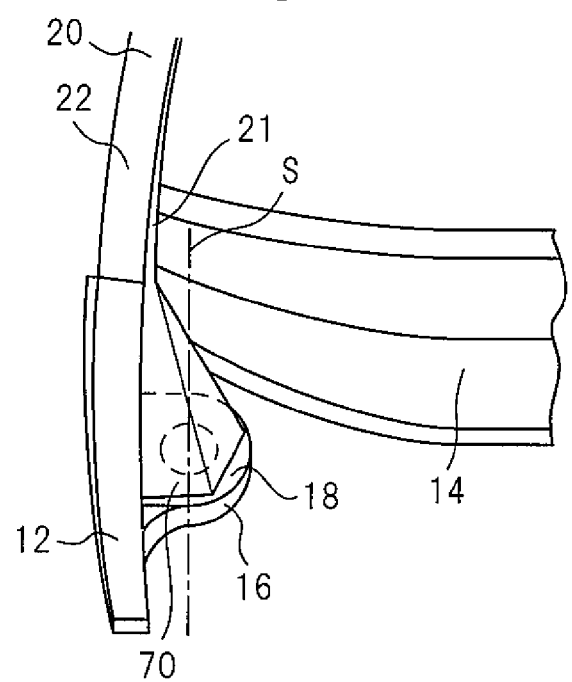
FIG. 11 is a top view of a part of the front body structure according to the second embodiment.

Further, the reinforcing parts 70, in the same way as the reinforcing parts 25 of the first embodiment, are joined to the strut setting parts 18 of the strut towers 16. The reinforcing parts 70, as shown in FIG. 10 and FIG. 11, are joined to the strut setting parts 18 of the strut towers 16 at both the body-outside and body-inside from the planes S. Therefore, the reinforcing parts 70, as will be understood from FIGS. 8 to 11, are joined to the strut setting parts 18 around the load points of the strut setting parts 18.

According to the front body structure 60 of the present embodiment configured in this way, the load which is input to the strut setting parts 18 of the strut towers 16 can be transmitted by the reinforcing parts 70 to not only the front pillars 20, but also the upper members 12 and cowl top 14. For this reason, the load which is transmitted to the front pillars 20, upper members 12, and cowl top 14 can be reduced and accordingly local deformation around the strut towers 16 can be suppressed to a greater degree. Due to this, it becomes possible to improve the torsional stiffness of the body 51 as a whole.

Note that, in the above embodiment, the reinforcing parts 70 were joined to both the upper members 12 and the cowl top 14, but it is not necessary that they be joined to both. They may also be joined to only one.

Further, the reinforcing parts 70 were joined by spot welding to the upper members 12 and cowl top 14. However, the reinforcing parts 70 may also be joined by a separate joining method to these upper members 12 and cowl top 14. In addition, the reinforcing parts 70 may be integrally shaped members which are formed from the same blanks as the component members forming at least parts of the upper members 12. Further, they may be integrally shaped members which are formed from the same blanks as component members forming at least part of the cowl top 14.

Embodiments of the present invention were explained, but the present invention is not limited to the above embodiment. Various changes can be made within a scope not deviating from the gist of the invention.

For example, in the above embodiments, the case where the main material of the body was high strength steel was explained, but all or part of the body may also be formed from aluminum, FRP, or another material which can generally be used for a body. Further, high strength steel was used for the reinforcing parts, but aluminum, FRP, and other materials may also be used.

Further, the present embodiments were explained assuming the front compartment mounted a motor or engine or other power unit, but the invention is not limited to this. It may also be used as a luggage compartment etc.

Further, the front body structure according to the present invention can of course be applied to not only an automobile which mounts an internal combustion engine, but also a hybrid vehicle or an electric vehicle in which motors are provided at the wheels, etc.

Further, the shape of the body as a whole is not limited to the one disclosed in FIG. 1 and FIG. 7. It may also be a sedan type, station wagon type, minivan type, SUV type, or other shape.

Examples

Figure 12:
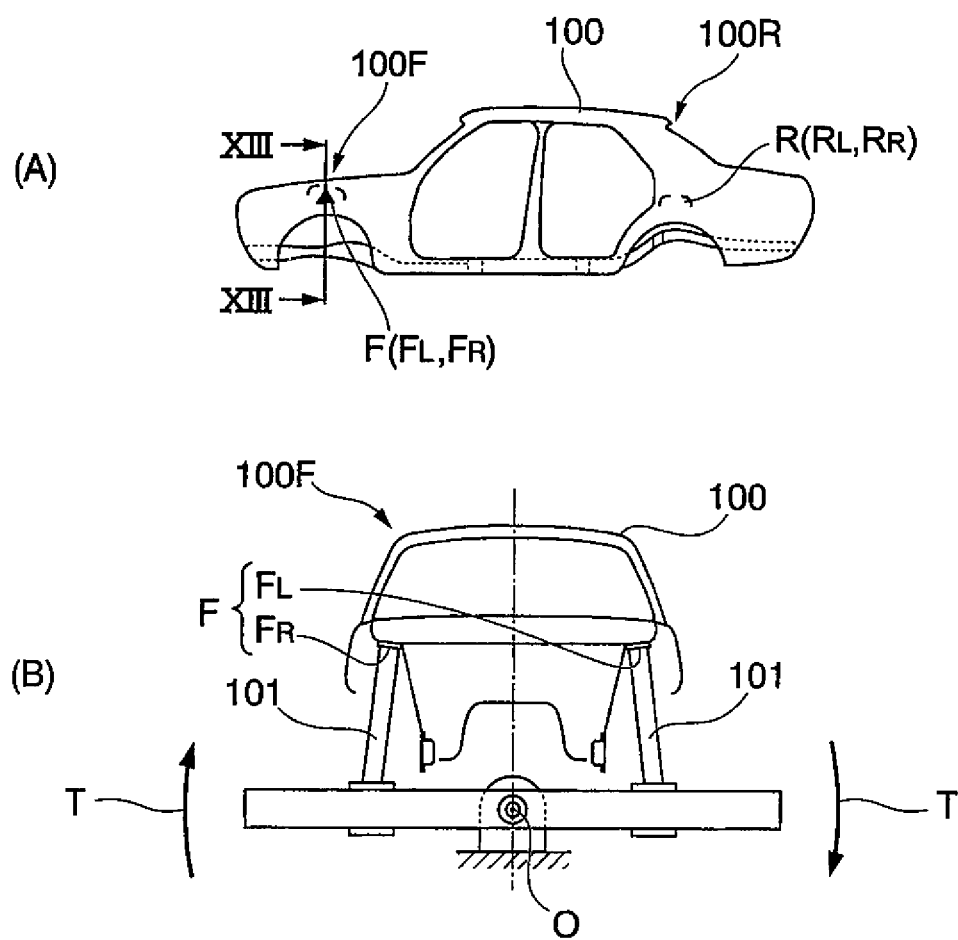
FIG. 12 give schematic views which show one example of a method of measurement of the torsional stiffness of a body, wherein (A) shows a position of application of a load in a longitudinal direction of the body structure, while (B) is a view seen along a line XIII-XIII in (A) and shows an outline of generation of a torque in a width direction of the body.
Figure 13:
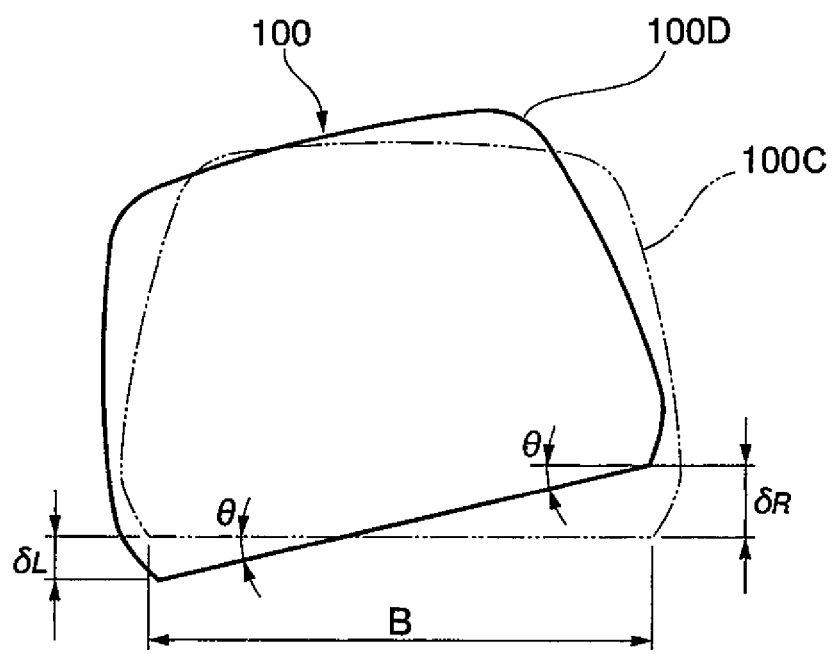
FIG. 13 is a view which shows displacement and the torsional angle of a body before and after application of a torsional torque as seen from line XIII-XIII of FIG. 12(A).

Here, to confirm the effect on the present embodiment, for example, the technique which is shown in FIG. 12 and FIG. 13 was used to calculate the torsional stiffness.

Below, first, referring to FIG. 12 and FIG. 13, the method of measurement and calculation of the torsional stiffness will be explained. FIG. 12 is a conceptual view which shows the method of measurement and calculation of the torsional stiffness of the body-in-white (body) 100, while FIG. 13 is a view for explaining the torsional stiffness based on the torsion of the front axle position 100F (position in front-rear direction of body at which front shaft is arranged) based on the rear axle position 100R (position in front-rear direction of body at which rear shaft is arranged).

To measure the torsional stiffness, for example, as shown in FIG. 12(A), the body-in-white 100 is fastened at the rear axle position 100R and the average torsional stiffness GJ which is obtained by application of the torsional torque at the front axle position 100F is used for evaluation (G: modulus of rigidity, J: polar moment of inertia of area)

Specifically, at the rear axle position 100R, the body-in-white 100 is fastened (for example, the strut setting parts $R_L$ and $R_R$ of the rear strut towers are fastened) and the top ends of dummy bars 101 are attached to the strut setting parts $F_L$ and $F_R$ of the front strut towers. In this state, a seesaw table 102 to which the bottom ends of the dummy bars 101 are attached is turned about the axis O. Due to this, a torsional torque T is applied to the strut setting parts $F_L$ and $F_R$ of the front strut towers (see FIG. 12(B)).

FIG. 13 is a view which shows the body cross-section at the front axle position 100F seen from the line XIII-XIII of FIG. 12(A). The torsional stiffness GJ is calculated based on the left and right displacements $\delta_L$ and $\delta_R$ of the body which occur at the front axle position 100F at the time of application of the above torsional torque T. Note that, in FIG. 9, 100C which is shown by the two-dot chain line and 100D which is shown by the solid line show the body (outside shape) before and after application of the torsional torque T.

Here, since the torsion angle θ(rad) due to the torsional torque T is small, it can be approximated as $\theta \approx \tan \theta = ((\delta_L + \delta_R)/B)$; (B is body width dimension relating to application of torsional torque T at front axle position 100F).

Specific Torsional stiffness $GJ=(T/(\theta/\text{wheelbase length } L))=(T \cdot B \cdot \text{wheelhouse length } L)/(\delta_L + \delta_R)$ (For example, see "Strength of Automobiles", Sankaido, Oct. 30, 1990, second edition)

As the conventional example, a model where the bottom ends of the front pillars were offset from the strut setting parts 300 mm outward in the width direction and 150 mm to the rear side was used. As an invention example, as shown in the first embodiment, a model where reinforcing parts which were formed integrally with the bottom ends of the front pillars were joined to the surroundings of the strut setting parts of the strut towers was used.

The above measurement and calculation method was used to calculate the torsional stiffness. As a result, in the invention example, it was confirmed that the torsional stiffness is improved 5.5% compared with the conventional example.

INDUSTRIAL APPLICABILITY

By improving the torsional stiffness of the body structure of an automobile, it is possible to improve the stability while the automobile is being driven, and therefore there is great industrial applicability.

REFERENCE SIGNS LIST 1, 51 body
2, 52 passenger compartment
3, 53 front compartment
10, 60 front body structure
12 upper member
14 cowl top
16 strut tower
20 front pillar
25, 70 reinforcing member

The invention claimed is:

1. A front body structure in a body which has a passenger compartment and a front compartment which is arranged at a front side of said passenger compartment, comprising:
   strut towers which are arranged inside said front compartment at two sides of a width direction of said front compartment and which have strut setting parts to which top edges of struts for front wheel are attached;
   front pillars which extend at the front of said passenger compartment at the two sides in the width direction from the roof of said passenger compartment toward the rear top edge of said front compartment; and
   reinforcing parts with first ends joined to the strut towers and with other ends joined to the front pillars,
   wherein said reinforcing parts are integrally shaped members which are formed from same blanks as component members forming at least parts of the front pillars, are at least parts of the ends of the front pillars, and are joined to the strut setting parts so that lower ends of said reinforcing parts completely enclose load points of the strut setting parts and are directly joined to the strut setting parts.

2. The front chassis structure as set forth in claim 1 wherein said front pillars comprise outer members which are arranged at chassis-outside and inner members which are arranged at a chassis-inside, and said reinforcing members are integrally shaped members which are formed from the same blanks as the inner members.

3. The front chassis structure as set forth in claim 1 or 2, further comprising a dash panel which separates said passenger compartment and said front compartment and a cowl top which extends above said dash panel in a width direction of a chassis, wherein said reinforcing members are also joined to said cowl top.

4. The front chassis structure as set forth in claim 3 wherein said reinforcing members are integrally shaped members which are formed from the same blanks as component members which form at least part of said cowl top.

5. The front chassis structure as set forth in claim 1, further comprising upper members which are arranged at width ends of said passenger compartment and extend in a front-rear direction of said chassis, wherein said reinforcing members are also joined to said upper members.

* * * * *